United States Patent [19]

Bhagat et al.

[11] Patent Number: 5,559,862
[45] Date of Patent: Sep. 24, 1996

[54] MOBILE PAGING TELEPHONE CALL BACK SYSTEM AND METHOD

[75] Inventors: Jai P. Bhagat, Jackson; Ernest A. Oswalt, Raymond; William D. Hays, Jackson, all of Miss.

[73] Assignee: Mobile Telecommunication Technologies, Jackson, Miss.

[21] Appl. No.: 299,091

[22] Filed: Sep. 2, 1994

[51] Int. Cl.⁶ .................................................. H04Q 7/38
[52] U.S. Cl. ................................ 379/58; 379/57; 379/355
[58] Field of Search .................................. 379/57, 58, 59, 379/354–356; 340/825.44; 455/33.1

[56] References Cited

U.S. PATENT DOCUMENTS

| | | | |
|---|---|---|---|
| H610 | 3/1989 | Focarile et al. | 379/57 |
| Re. 33,417 | 10/1990 | Bhagat et al. | |
| 4,985,918 | 1/1991 | Tanaka et al. | 379/356 |
| 5,099,507 | 3/1992 | Mukai et al. | 379/57 |
| 5,148,473 | 9/1992 | Freeland et al. | 379/57 |
| 5,157,719 | 10/1992 | Waldman | 379/355 |
| 5,212,721 | 5/1993 | DeLuca et al. | 379/57 |
| 5,280,516 | 1/1994 | Jang | 379/57 |
| 5,305,372 | 4/1994 | Tomiyori | 379/59 |
| 5,452,353 | 9/1995 | Menezes | 379/355 |
| 5,475,743 | 12/1995 | Nixon et al. | 379/355 |

*Primary Examiner*—Dwayne D. Bost
*Attorney, Agent, or Firm*—Finnegan, Henderson, Farabow, Garrett, & Dunner, L.L.P.

[57] ABSTRACT

A mobile paging telephone call back device determines and adds the appropriate prefix to a received call back number. The call back device includes a pager, a control unit, an automatic dialer, and a cellular telephone. The pager receives a page message from a paging system central controller. The control unit extracts a dialable telephone number from the page message, determines the appropriate prefix to be added to the telephone number, and adds the prefix to the telephone number. Using the telephone number with the added prefix, the automatic dialer completes a call back for the cellular telephone.

20 Claims, 6 Drawing Sheets

MOBILE PAGING TELEPHONE CALL BACK SYSTEM AND METHOD

BACKGROUND OF THE INVENTION

1. Field of the Invention

The present invention relates to mobile paging telephone call back systems and methods. More particularly, the present invention relates to systems and methods for adding appropriate prefixes to received telephone numbers to permit automatic dialing of the telephone numbers by a mobile telephone device.

2. Description of Related Art

Today's mobile cellular telephones offer tremendous communication advantages for mobile consumers. Because cellular telephones often exhibit poor reception qualities and consume power quickly, however, cellular companies have begun to incorporate paging receivers into cellular telephones. With the paging receiver, the cellular telephone can be turned off, conserving battery life, while the paging receiver remains on monitoring for calls. Battery life is conserved because the power to energize a paging receiver is comparatively low. An example of a mobile paging telephone call back device is disclosed in commonly assigned U.S. Pat. No. Re. 33,417 ("the '417 patent"), entitled "Mobile Paging Call Back System and Related Method," by Bhagat et al., the contents of which are hereby incorporated by reference.

FIG. 1 is a block diagram of a mobile paging telephone call back device 10, as described in the '417 patent. The mobile paging telephone call back device 10 includes a control unit 12 connected to a radio pager 14, a memory 16, a radio telephone interface 18, control switches 20, and an indicator 22. The radio telephone interface 18 is also connected to an intelligent automatic dialer 24, which is in turn connected to a mobile radio telephone 26.

The device 10 operates as follows: a caller wishing to reach a subscriber (a user of the mobile paging telephone device 10) calls a paging station (not shown), leaves a call back telephone number, and, typically, hangs up. The paging station then transmits the call back telephone number over the air. The radio pager 14 receives the call back telephone number and passes it to control unit 12. The control unit 12 processes the number, stores it in memory 16, and displays it on indicator 22. A subscriber wishing to return the call presses a control switch 20, activating the automatic dialer 24 to dial the displayed call back telephone number.

Mobile paging telephone devices, like call back device 10, greatly conserve the battery life of the cellular telephone, which, as described, can be turned-off, then turned-on when a page comes in. Today's mobile paging telephone devices suffer, however, from one nagging disadvantage; they often cannot complete the call back because the call back telephone number lacks the appropriate prefix, such as an area code or a "1", necessary to complete the return call. For example, a calling party may be unaware of the location of the subscriber and fail to include the prefix "1" and area code when he or she enters the call back telephone number. This information may be necessary to complete a long distance dial back call. Conversely, the calling party may unnecessarily include a "1" or an area code in the call back telephone number, thinking the subscriber is away, when the subscriber is actually local. This problem is compounded in areas where dialing plans require a prefix, such as an area code, to complete even local calls.

In each of the above situations, conventional mobile paging telephone devices cannot automatically complete a call using the call back number as received. Instead, the subscriber must manually dial all or part of the call back number including the appropriate prefix. If the subscriber does not know the appropriate prefix, he simply cannot return the call.

SUMMARY OF THE INVENTION

Accordingly, the present invention is directed to a mobile paging telephone call back system and method that substantially obviates one or more of the problems due to limitations and disadvantages of the related art.

To achieve these and other advantages and in accordance with the purpose of the invention, as embodied and broadly described, the present invention provides, in a paging system central controller, a method of transmitting a page message containing a call back number, comprising the steps of receiving a message from a caller; receiving an area code representing the area code of the caller; determining whether the received message contains a dialable call back number; if the received message contains a dialable call back number, determining whether the call back number has an area code; adding the received area code to the call back number if the call back number does not have an area code or the received area code does not match an area code of the call back number; and transmitting the received message including the call back number.

Further, the present invention provides a method of receiving a page message containing a call back number on a mobile paging telephone call back device, comprising the steps of receiving an incoming message at the mobile paging telephone call back device; extracting a call back number from the received message; receiving a system identification number (SID) at the mobile paging telephone call back device; determining a roaming status of the mobile paging telephone call back device; determining an appropriate dialing plan based on the received SID; and determining a prefix for the call back number based on the appropriate dialing plan and roaming status of the mobile paging telephone call back device.

Additionally, the present invention provides a mobile paging telephone call back device comprising means for receiving a page message including a call back number; controlling means for determining an appropriate prefix to be added to the call back number; and means for displaying the call back number with the appropriate prefix.

BRIEF DESCRIPTION OF THE DRAWINGS

The accompanying drawings which are incorporated in and constitute a part of the specification, illustrate presently preferred implementations of this invention and, together with a general description given above and the detailed description of the preferred implementations given below, serve to explain the principles of the invention.

In the drawings.

DETAILED DESCRIPTION

Figure 1:
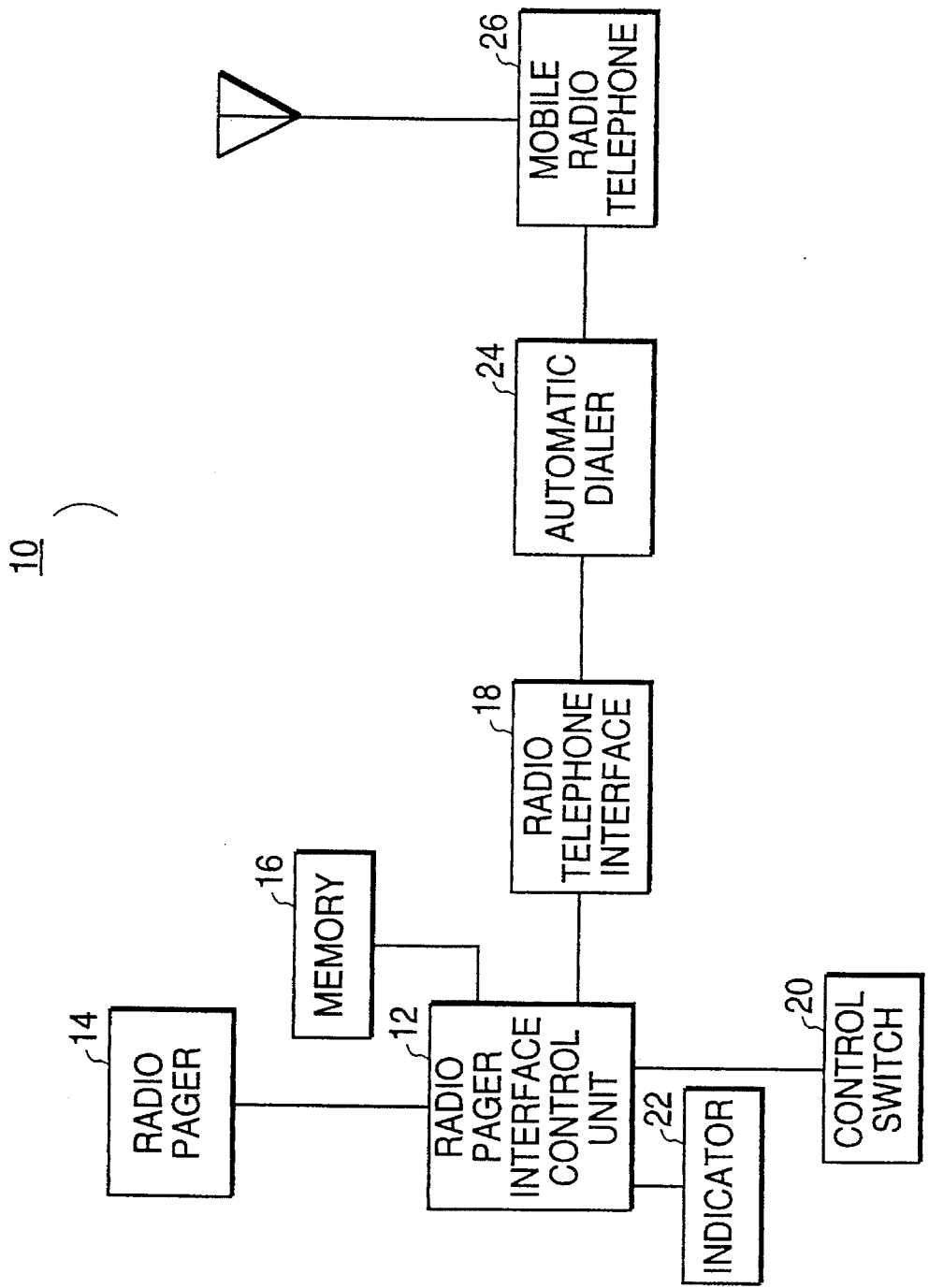
FIG. 1 shows a block diagram of a conventional mobile paging telephone call back device.
Figure 2:
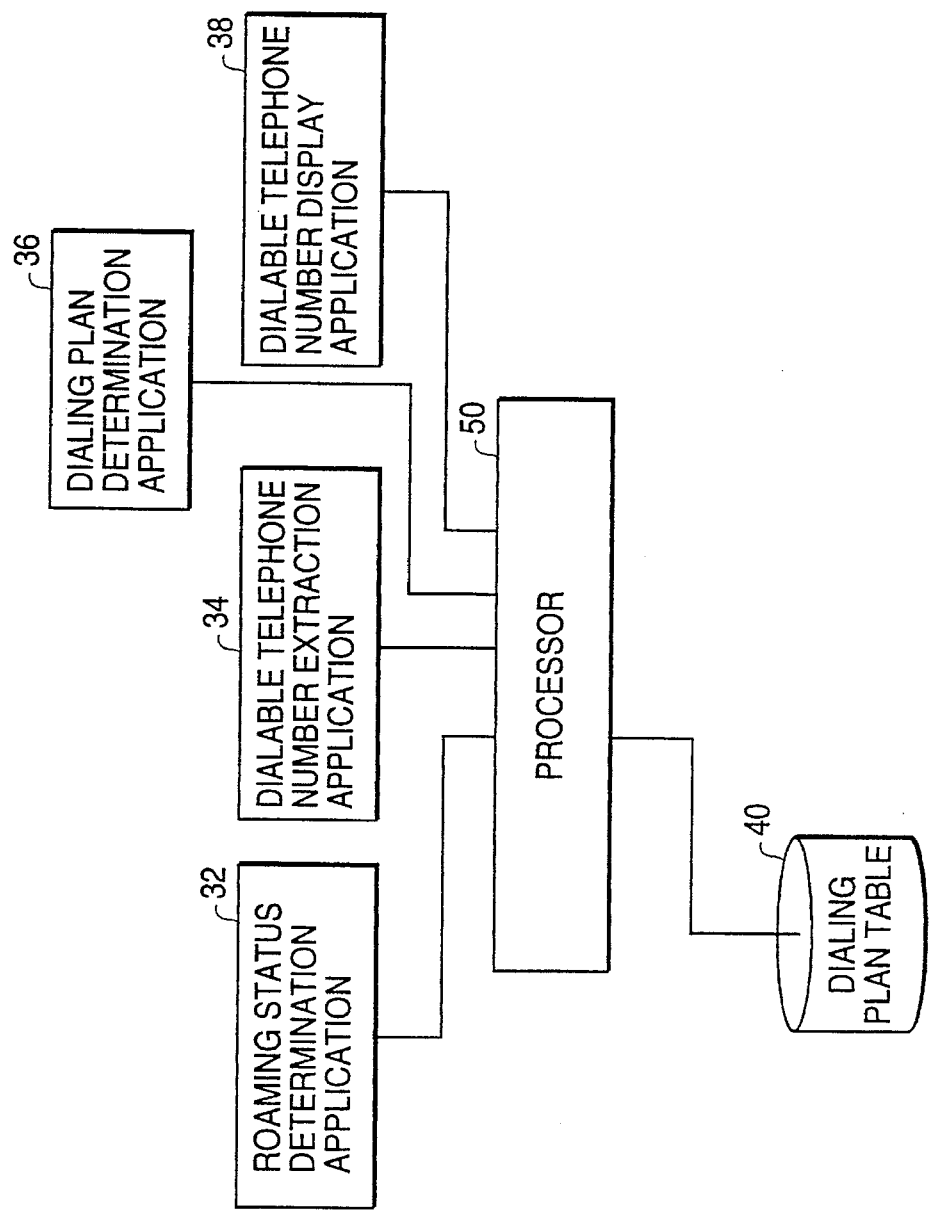
FIG. 2 is a block diagram of a control unit included in a mobile paging telephone call back device according to a preferred embodiment of the present invention.

A preferred embodiment of the mobile paging telephone call back device of the present invention is similar to the conventional one described above, but preferably includes several changes in accordance with the present invention. As shown in FIG. 2, the control unit 12 of the mobile paging telephone call back device of the present invention includes Roaming Status Determination ("RSD") application 32, Dialable Telephone Number Extraction ("DTNE") application 34, Dialing Plan Determination ("DPD") application 36, Dialable Telephone Number Display ("DTND") application 38, dialing plan table 40, and processor 50. Applications 32, 34, 36, and 38 are executed on processor 50. Processor 50 has access to data stored in table 40, as well as memory 16 (FIG. 1). Preferably, processor 50 is of any known type capable of controlling the applications 32, 34, 36, and 38 and performing the functions described herein.

Upon receiving a page message, pager 14 activates telephone 26, which, upon initialization, receives a switch system identification number (SID) from the local cellular switch. RSD application 32 determines the "roaming" status of the mobile paging telephone device of the present invention, that is, whether the mobile paging telephone device is in a region serviced by the subscriber's cellular carrier. Preferably, RSD application 32 compares the received SID with a prestored SID that identifies the subscriber's cellular carrier. If the received SID and prestored SID are the same, then the RSD application 32 determines that the call back device is not roaming. However, if the received SID and prestored SID are not the same, then the RSD application 32 determines that the call back device is roaming.

DTNE application 34 extracts the telephone numbers contained in received page messages and stores them in memory 16. DTNE application 34 recognizes dialable telephone numbers according to acceptable telephone number formats, such as the North American Numbering Plan and the World Numbering Plan. The formats recognized by DTNE application 34 can be updated or modified "over the air" using conventional techniques. For example, a paging transmitter can transmit a group page message including updated telephone formats to the call back devices. Another way of updating the recognized formats is to transmit the format information over the cellular telephone for storage in the call back device.

Dialing plan table 40 stores dialing plans of various telephone regions located throughout predefined geographic regions, such as, for example, North America. Each dialing plan includes the proper telephone number format for placing calls within the predefined geographical region. The dialing plans are indexed according to SID and can be updated "over the air" using conventional techniques such as described above.

DPD application 36 determines the dialing plan corresponding to the region in which the subscriber is located. DPD application 36 finds the appropriate dialing plan by searching the dialing plan table 40 according to the received SID. When the appropriate dialing plan is found, dialing plan table 40 makes the dialing plan available to DTND application 38.

Based on the dialing plan determined by DPD application 36 and the roaming status determined by RSD application 32, DTND application 38 formats the received call back telephone number by adding to that call back telephone number any prefixes necessary to complete the call, and displays the formatted telephone number on indicator 22. For example, if the dialing plan requires an area code as a prefix to complete a local call, then DTND application 38 checks whether the area code has been included in the received call back number and, if not, adds the area code. With the telephone number formatted, the subscriber can automatically dial the call back number by, for example, activating a single switch or pressing an appropriate function key.

Figure 3:
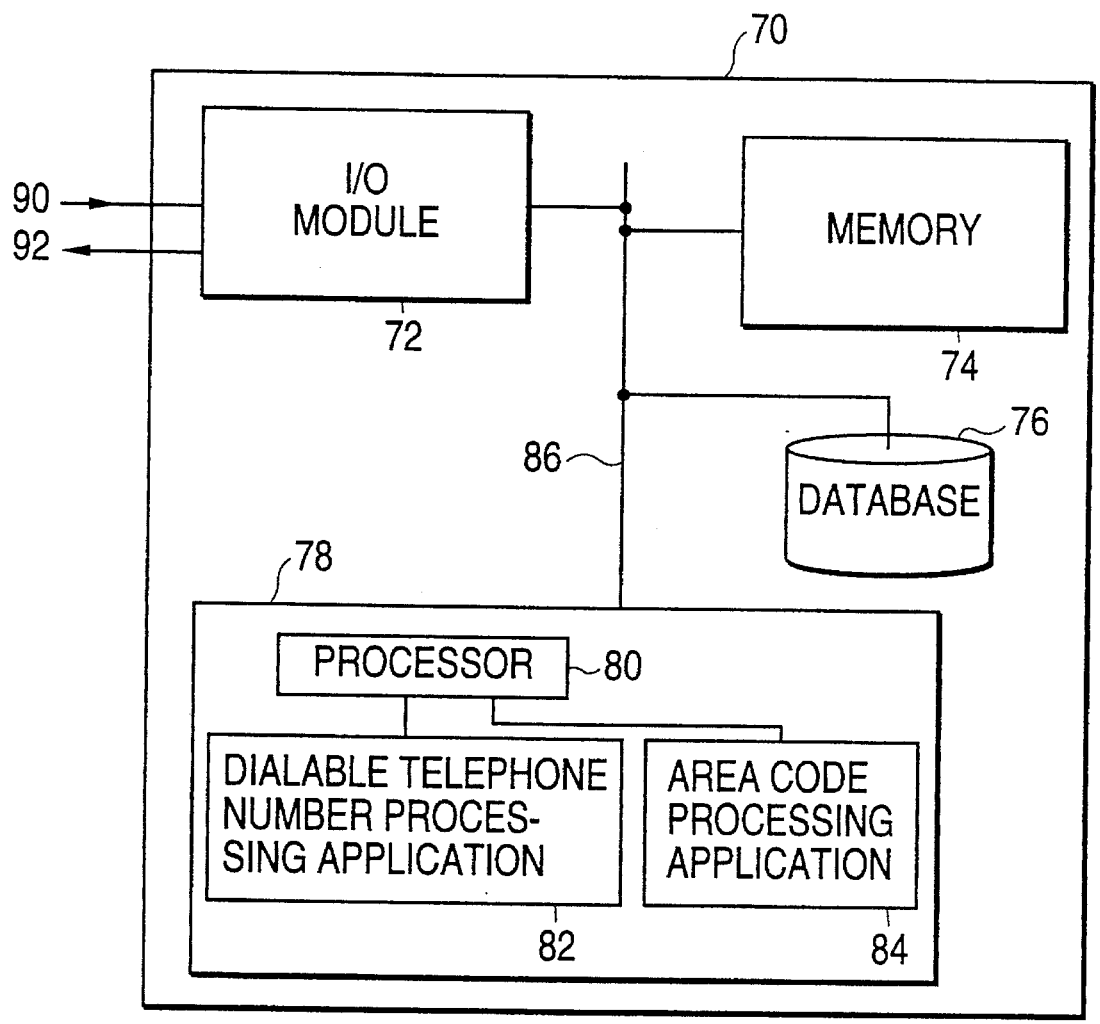
FIG. 3 is a block diagram of a paging system central controller according to a preferred embodiment of the present invention.

FIG. 3 shows a block diagram of a paging system central controller 70, which transmits page messages to the call back device of the present invention. Generally, central controller 70 is similar to conventional paging central controllers, such as the Universal Messaging System ("UMS"), owned and operated by SKYTEL® of Washington, D.C., except as modified herein in accordance with the present invention. As shown in FIG. 3, paging system central controller 70 includes I/O module 72, memory 74, database 76, and controller 78, which are all connected to bus 86.

I/O module 72 prompts a caller to enter information via input 90, including the subscriber's personal identification number ("PIN") and a call back number. In accordance with conventional techniques, I/O module 72 also receives on input 90 an Automatic Number Identification ("ANI") from the telephone carrier carrying the caller's call. The ANI preferably includes at least an area code, and may include any additional digits, in accordance with a telephone numbering format. I/O module 72 outputs on output 92 a page message to a paging transmitter (not shown), which transmits the page message to the subscriber.

Memory 74 stores information received from I/O module 72, including call back telephone numbers and ANIs. Database 76 stores records of information corresponding to each subscriber.

Controller 78 processes the received page message and includes processor 80, Dialable Telephone Number Processing ("DTNP") application 82, and Area Code Processing ("ACP") application 84. Applications 82 and 84 are performed on processor 80, which is of any known type capable of performing the functions described herein. DTNP application 82 determines whether the received page message contains a dialable telephone number. ACP application 84 determines whether the dialable telephone number includes an area code and, if so, compares the area code with an area code in the received ANI to determine whether they match.

Figure 4:
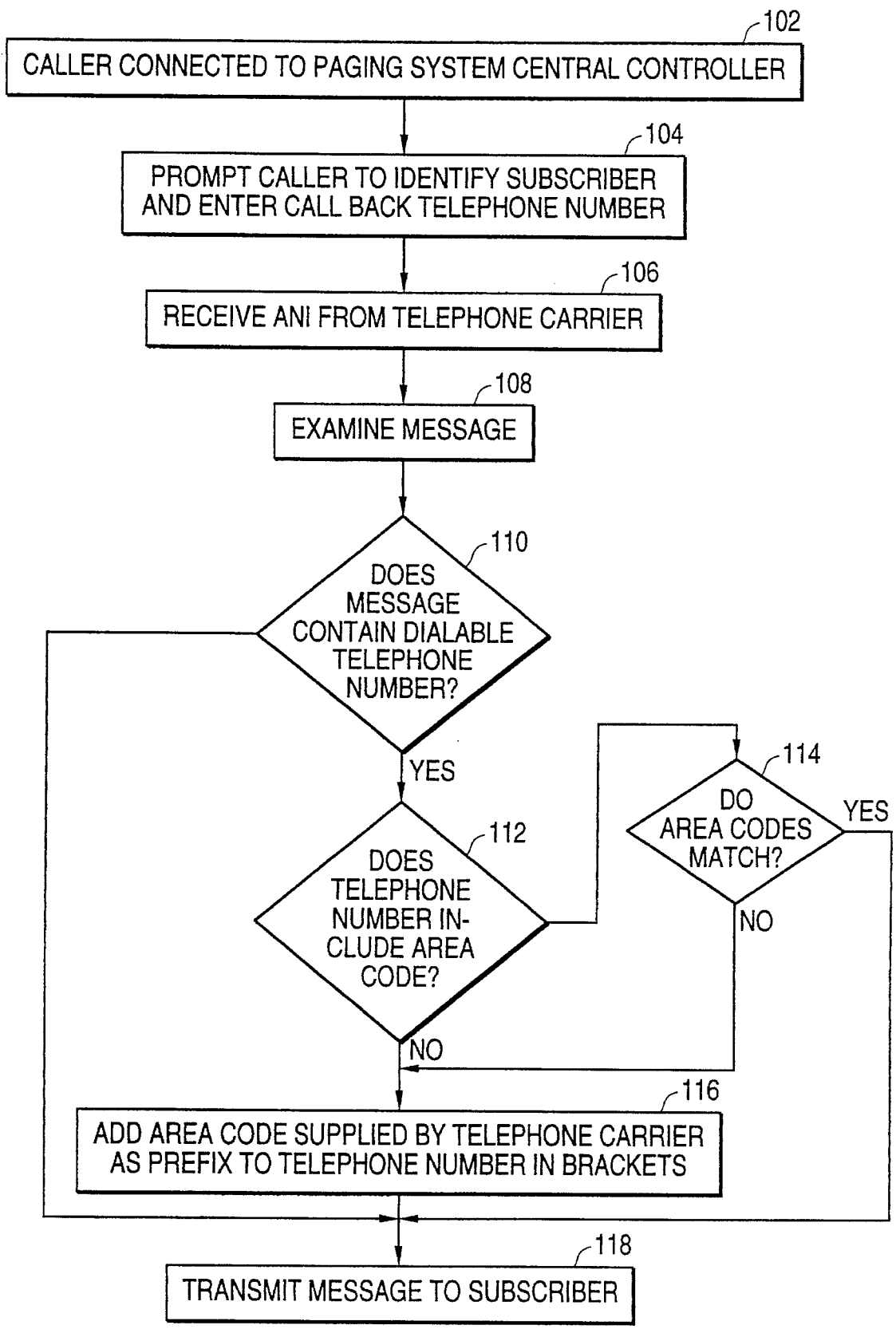
FIG. 4 is a flow diagram illustrating processing operations of a paging system central controller according to a preferred embodiment of the present invention.

FIG. 4 shows a flow diagram describing the operation of paging system central controller 70 for transmitting a page message in accordance with a preferred embodiment of the present invention. Initially, a caller (or paging party) wishing to page a subscriber dials into paging system central controller 70 (step 102). The paging system central controller 70 prompts the caller to identify the subscriber to be paged by requesting the caller to enter the subscriber's PIN (step 104). After the caller identifies the subscriber, the paging system central controller 70 prompts the caller to enter a call back telephone number (also step 104). In accordance with conventional techniques, the telephone carrier handling the call automatically supplies to the paging system central controller 70 the ANI, preferably identifying at least the area code from which the caller is calling (step 106).

DTNP application 82 of the paging system central controller 70 then examines the message (step 108) to determine whether the page message includes a dialable telephone number (step 110). DTNP application 82 recognizes dialable telephone numbers according to acceptable telephone number formats similar to DTNE application 34 described above. If the page message does not contain a dialable telephone number, the paging system central controller 70 proceeds to transmit the message to the subscriber without modifying the message (step 118).

If the message does contain a dialable telephone number, ACP application 84 of the paging system central controller 70 determines whether the telephone number includes an area code (step 112). If no area code is included, the paging system central controller 70 adds the area code that was part of the ANI and supplied by the telephone carrier as a prefix to the telephone number. Controller 70 preferably marks the area code prefix by, for example, enclosing the area code in brackets (step 116). The paging system central controller 70 then transmits a page message, including the bracketed area code and telephone number, to the subscriber (step 118).

If, in step 110, the dialable telephone number does include an area code, the paging system central controller 70 preferably determines whether the area code included in the received telephone number matches the area code received from the telephone carrier (step 114). This step is included to verify the area code, but could be deleted. If the area codes match, then the page message, including the received telephone number, is transmitted to the subscriber (step 118). If, in step 114, the area codes do not match, the paging system central controller 70 adds the area code supplied by the telephone carrier, again, preferably marked in brackets, to the page message (step 116) and transmits to the subscriber the modified page message, including the bracketed area code, the originally received area code (unbracketed), and the received telephone number (step 118). Both area codes are transmitted to allow the subscriber to select the one he believes is correct.

Figure 5:
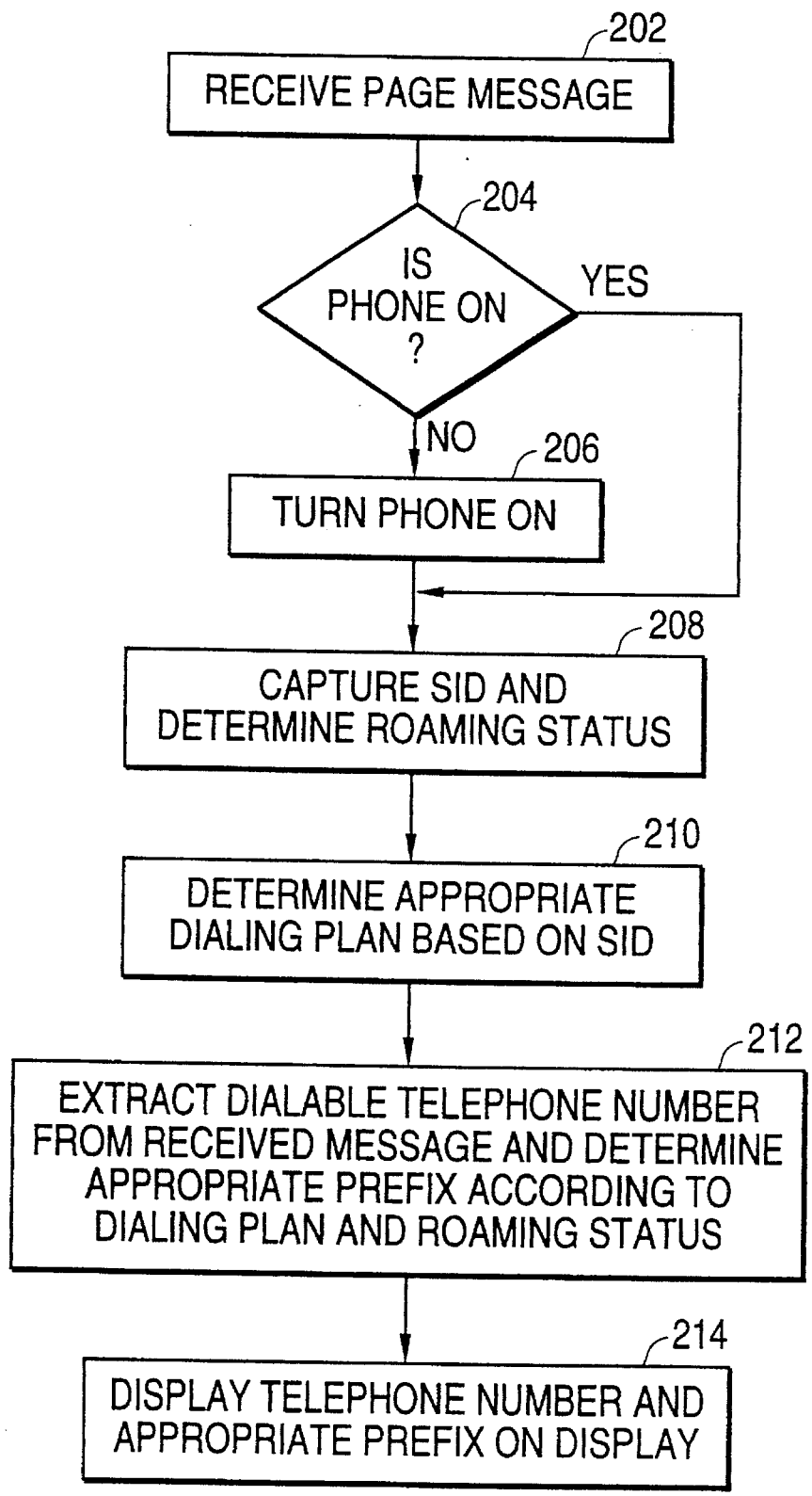
FIG. 5 is a flow diagram illustrating processing operations of the mobile paging telephone call back device according to the present invention.

FIG. 5 shows a flow diagram describing a preferred operation of the call back device of the present invention. Initially, pager 14 receives a message transmitted from the paging system central controller 70 (step 202) and determines whether cellular phone 26 is turned on (step 204). If the cellular phone 26 is not on, pager 14 turns on the cellular phone 26 (step 206). In accordance with conventional techniques, during initialization of the cellular phone 26, cellular phone 26 receives an SID from the local cellular switch and determines the roaming status of the call back device in the manner described above (step 208). Based on the received SID, DPD application 36 of the call back device retrieves the appropriate dialing plan (step 210), as also described above. The call back device extracts the dialable telephone number from the received page message and determines the appropriate prefixes according to the dialing plan and roaming status (step 212). The telephone number is then displayed on indicator 22 along with the appropriate prefixes (step 214). As described in the incorporated U.S. Pat. No. Re. 33,417, the control unit 12 may perform steps to "verify" the received telephone number. However, these verification steps need not be performed in accordance with one embodiment of the present invention.

Figure 6:
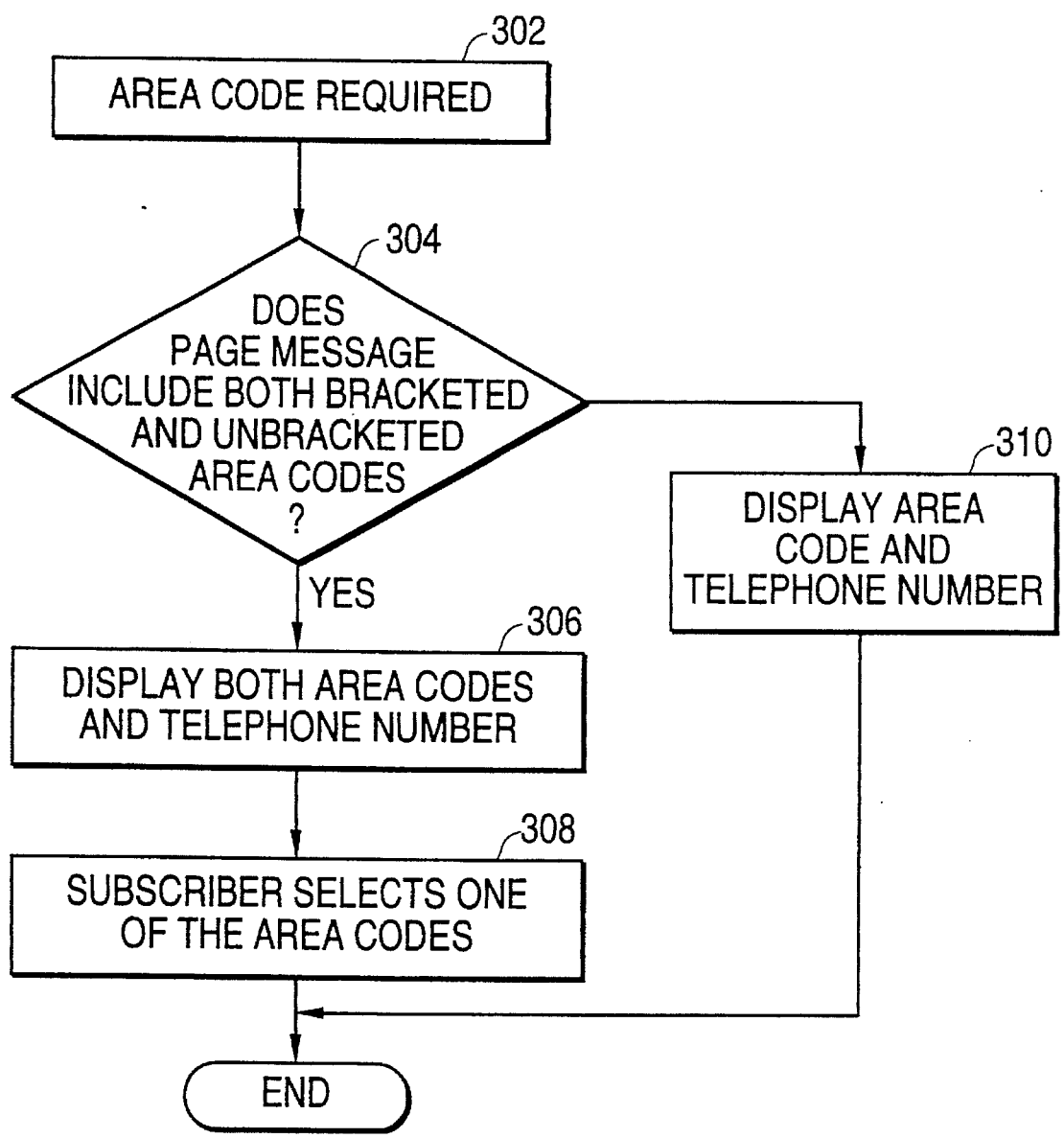
FIG. 6 is a flow diagram illustrating additional processing operations of the mobile paging telephone call back device according to the present invention.

FIG. 6 shows a flow diagram illustrating operation of the call back device where the call back device, in step 212 above, determines that the appropriate prefix includes an area code. If the call back device determines that an area code is required to complete the call back operation (step 302) and the page message includes both an unbracketed area code and a bracketed area code (step 304), both area codes are displayed on indicator 22 along with the call back number (step 306). The subscriber can select the area code that he believes will complete the call back using, for example, a switch 20 included for this purpose (step 308). If only a single area code is included in the page message, e.g., a bracketed or unbracketed area code, then that area code is displayed along with the call back telephone number on indicator 22 (step 310).

While there has been illustrated and described what are at present considered a preferred implementation and method of the present invention, it will be understood to those skilled in the art that various changes and modification may be made, and equivalents may be substituted for elements thereof without departing from the true scope of the invention.

In addition, many modifications may be made to adapt a particular element, technique, or implementation to the teachings of the present invention without departing from the central scope of the invention. For example, applications 32, 34, 36, and 38 preferably comprise software procedures, such as microcode, executed by processor 50 to perform the specified functionality. However, in an alternative embodiment, this functionality can be implemented in electronic circuitry in accordance with conventional techniques. Therefore, it is intended that this invention not be limited to the particular embodiments and methods disclosed herein, but that the invention include all embodiments falling within the scope of the pendant claims.

What is claimed:

1. In a paging system central controller, a method of transmitting a page message containing a call back number, comprising the steps of:

receiving a message from a caller;

receiving an area code representing the area code of the caller;

determining whether the received message contains a dialable call back number;

if the received message contains a dialable call back number, determining whether the call back number has an area code;

adding the received area code to the call back number if the call back number does not have an area code or the received area code does not match an area code of the call back number; and transmitting the received message including the call back number.

2. A method according to claim 1, wherein the received area code is added to the call back number in marked fashion.

3. A method according to claim 1, wherein a dialable telephone number is determined according to the North American Numbering Plan.

4. A method according to claim 1, wherein a dialable telephone number is determined according to the World Numbering Plan.

5. A method according to claim 1, wherein a dialable telephone number comprises one of a seven digit number and a ten digit number.

6. A method according to claim 1, wherein a dialable telephone number contains a number of digits, in accordance with the World Numbering Plan.

7. A method of receiving a page message containing a call back number on a mobile paging telephone call back device, comprising the steps of:

receiving an incoming message at the mobile paging telephone call back device;

extracting a call back number from the received message;

receiving a system identification number (SID) at the mobile paging telephone call back device;

determining a roaming status of the mobile paging telephone call back device;

determining an appropriate dialing plan based on the received SID; and determining a prefix for the call back number based on the appropriate dialing plan and roaming status of the mobile paging telephone call back device.

8. A mobile telephone paging call back device comprising:

means for receiving a page message including a call back number;

controlling means for determining an appropriate prefix to be added to the call back number in accordance with a system identification number (SID); and means for displaying the call back number with the appropriate prefix.

9. A mobile paging telephone call back device according to claim 8, wherein said controlling means includes:

means for extracting the call back number from the page message; and means for determining an appropriate dialing plan based on the SID.

10. A mobile paging telephone call back device according to claim 9, further comprising:

means for storing a plurality of dialing plans.

11. A mobile paging telephone call back device according to claim 9, further including:

memory means for storing extracted telephone numbers.

12. A mobile paging telephone call back device according to claim 8, wherein the appropriate prefix is determined according to a dialing plan.

13. A mobile paging telephone call back device according to claim 8, wherein the appropriate prefix includes an area code.

14. A mobile paging telephone call back device according to claim 13, wherein the area code comprises one of a plurality of area codes selected by a subscriber to be dialed with the call back number.

15. A mobile paging telephone call back device according to claim 8, further comprising:

a mobile telephone for receiving and placing telephone calls; and means for automatically dialing the appropriate prefix and call back number.

16. A mobile paging telephone call back device according to claim 15, wherein the receiving means activates the mobile telephone when the receiving means receives a page message.

17. The mobile paging telephone call back device according to claim 8, wherein said controlling means includes:

means for extracting the call back number from the page message; and means for determining a roaming status based on the SID.

18. A mobile paging telephone call back device according to claim 17, wherein said controlling means determines the appropriate prefix according to the roaming status of the call back device.

19. A method of receiving a page message containing a call back number on a mobile paging telephone call back device, comprising the steps of:

receiving an incoming message at the mobile paging telephone call back device;

extracting a call back number from the received message;

receiving a system identification number (SID) at the mobile paging telephone call back device; and determining an appropriate prefix for the call back number based on the SID.

20. The method according to claim 19, further comprising the step of adding the appropriate prefix to the call back number.

\* \* \* \* \*